(12) United States Patent
Abt et al.

(10) Patent No.: US 11,933,377 B2
(45) Date of Patent: Mar. 19, 2024

(54) DISC BRAKE HAVING A SHEET METAL ARRANGEMENT FOR A VEHICLE, AND SHEET METAL ARRANGEMENT FOR A DISC BRAKE

(71) Applicant: BPW Bergische Achsen KG, Wiehl (DE)

(72) Inventors: Christian Abt, Gummersbach (DE); Stefan Pantel, Eitorf (DE)

(73) Assignee: BPW Bergische Achsen KG, Wiehl (DE)

( * ) Notice: Subject to any disclaimer, the term of this patent is extended or adjusted under 35 U.S.C. 154(b) by 479 days.

(21) Appl. No.: 17/276,834

(22) PCT Filed: Sep. 10, 2019

(86) PCT No.: PCT/DE2019/100806
§ 371 (c)(1),
(2) Date: Mar. 17, 2021

(87) PCT Pub. No.: WO2020/057694
PCT Pub. Date: Mar. 26, 2020

(65) Prior Publication Data
US 2022/0056973 A1 Feb. 24, 2022

(30) Foreign Application Priority Data
Sep. 17, 2018 (DE) ...................... 10 2018 122 726.4

(51) Int. Cl.
*F16D 55/226* (2006.01)
*F16D 65/097* (2006.01)
(Continued)

(52) U.S. Cl.
CPC ........... *F16D 65/84* (2013.01); *F16D 55/226* (2013.01); *F16D 2055/0037* (2013.01);
(Continued)

(58) Field of Classification Search
CPC ........ F16D 55/226; F16D 65/84; F16D 65/18; F16D 2055/0037; F16D 2065/785; F16D 2125/40; F16D 2200/0021; F16D 65/097
See application file for complete search history.

(56) References Cited

U.S. PATENT DOCUMENTS 4,431,090 A * 2/1984 Kinoshita ............... F16D 65/18
188/264 G
4,527,672 A * 7/1985 Schreiner ................ F16D 65/84
188/264 G
(Continued)

FOREIGN PATENT DOCUMENTS

CN 105370770 3/2016
CN 106641042 5/2017
(Continued)

*Primary Examiner* — Thomas W Irvin
(74) *Attorney, Agent, or Firm* — Gudrun E. Huckett

(57) ABSTRACT

A disc brake for a vehicle, having a first and a second brake lining (2a), and a brake disc (1) which is arranged between them, and a brake caliper which engages over the brake disc (1) with a brake caliper housing (6), in which a brake application device is arranged, wherein the brake application device comprises a pressure piece (3) which can be applied against the first brake lining (2a), wherein a boot (5) is provided for protecting the interior of the brake caliper housing against contaminants, wherein the boot (5) is fastened by way of a first end region (5a) to the brake caliper housing (6) and by way of a second end region (5b) to a sheet metal arrangement (7) consisting of a sheet metal plate (8) and a sheet metal ring (9) which is arranged coaxially with respect thereto and is connected in an integrally joined manner to said sheet metal plate (8), wherein the sheet metal plate (8) is arranged between an end side of the pressure piece (3) and the first brake lining (2a), wherein the sheet metal ring (9) is arranged between the boot (5) and the brake lining (2a) for protecting the boot (5) against heat radiation
(Continued)

which is generated by way of braking operations on the brake linings (2a, 2b) and the brake disc (1), and wherein the sheet metal ring (9) has at least one cut-out (11) for reducing its flexural stiffness.

8 Claims, 2 Drawing Sheets

(51) Int. Cl.
  *F16D 65/18* (2006.01)
  *F16D 65/84* (2006.01)
  F16D 55/00 (2006.01)
  F16D 65/78 (2006.01)
  F16D 125/40 (2012.01)

(52) U.S. Cl.
  CPC ........ *F16D 65/18* (2013.01); *F16D 2065/785* (2013.01); *F16D 2125/40* (2013.01); *F16D 2200/0021* (2013.01)

(56) References Cited

U.S. PATENT DOCUMENTS

| | | | |
|---|---|---|---|
| 4,537,289 A | 8/1985 | Von Grünberg et al. | |
| 8,348,025 B2* | 1/2013 | Arbesman | F16D 65/0006 188/264 G |
| 8,387,761 B2* | 3/2013 | Siebke | F16J 3/043 188/71.6 |
| 10,690,204 B1* | 6/2020 | Takeuchi | F16D 65/18 |
| 11,441,627 B2* | 9/2022 | Hecker | B60T 1/065 |
| 2001/0047913 A1* | 12/2001 | Conti | F16D 65/18 188/72.1 |
| 2009/0236189 A1 | 9/2009 | Macke | |
| 2011/0233013 A1* | 9/2011 | Siebke | F16D 65/18 188/264 G |
| 2018/0003253 A1 | 1/2018 | Schoefberger et al. | |
| 2018/0106308 A1 | 4/2018 | Fricke et al. | |
| 2018/0106309 A1 | 4/2018 | Fricke et al. | |
| 2018/0106313 A1 | 4/2018 | Fricke et al. | |
| 2020/0191216 A1* | 6/2020 | Takeuchi | F16J 15/50 |

FOREIGN PATENT DOCUMENTS

| | | |
|---|---|---|
| DE | 21 34 940 | 1/1973 |
| DE | 31 43 165 | 7/1982 |
| DE | 38 33 766 | 4/1990 |
| DE | 10 2006 039 297 | 3/2008 |
| DE | 20 2006 021 267 | 12/2014 |
| EP | 0 362 546 | 4/1990 |
| GB | 2 086 531 | 5/1982 |
| RU | 2566570 | 4/2014 |
| WO | 2010/049133 | 5/2010 |
| WO | 2016/116096 | 7/2016 |

* cited by examiner

DISC BRAKE HAVING A SHEET METAL ARRANGEMENT FOR A VEHICLE, AND SHEET METAL ARRANGEMENT FOR A DISC BRAKE

BACKGROUND OF THE INVENTION

The invention relates to a disc brake for a vehicle having a first brake pad and a second brake pad as well as a brake disc which is disposed therebetween and a brake caliper which engages over the brake disc and has a brake caliper housing in which a tensioning installation is disposed, wherein the tensioning installation comprises a compression piece which is able to be tensioned in relation to the first brake pad, wherein a bellows for protecting the interior of the brake caliper housing against contamination is provided, wherein the bellows by way of a first end region is fastened to the brake caliper housing and by way of a second end region is fastened to a sheet metal arrangement made from a sheet metal plate and a sheet metal ring which is disposed so as to be coaxial with and connected to the latter in a materially integral manner, wherein the sheet metal plate is disposed between an end side of the compression piece and the first brake pad, wherein the sheet metal ring is disposed between the bellows and the brake pad for protecting the bellows against thermal radiation that is generated on the brake pads and the brake disc by braking procedures.

The invention furthermore relates to a sheet metal arrangement for such a disc brake, comprising a central sheet metal plate and a sheet metal ring which is disposed so as to be coaxial with and connected in a materially integral manner to the latter and serves for protection against thermal radiation. The invention furthermore also relates to a disc brake having such a sheet metal arrangement.

Commercial vehicles, in particular commercial vehicle trailers and so-called semi-trailers typically are of modular construction and adapted to a chassis which is received thereon. The running gear arrangement of the commercial vehicle comprises at least one axle device, wherein the at least one axle device is assembled from a plurality of modules. The axle device is in particular assembled from the actual wheel axle with the vehicle road wheels, the brakes, the elements of the vehicle suspension, and the shock absorbers. In the production of a running gear arrangement for a commercial vehicle semi-trailer, for example, three axle devices are fastened to the vehicle frame of the commercial vehicle semi-trailer, this in most instances taking place by screw-fitting or in some instances also by welding.

A protective cap for a piston of a disc brake with a partial pad, having a ring made from an elastic material, is derived from DE 21 34 940 A1 The ring on the external ring circumference is fixedly connectable to the brake cylinder housing. The ring furthermore has a ring crease which fits into an annular space configured between the cylinder wall and an annular shoulder on the disc-proximal piston end, the inner rim thereof being supported on the piston. The opening of the ring is provided with a sheet metal disc which all around is tightly connected to the inner rim of the ring. Furthermore, a sheet metal ring is welded to the sheet metal disc, wherein the sheet metal ring covers the elastic ring up to the outer rim of the latter and protects the elastic ring against the thermal radiation of a brake shoe.

The invention is based on the object of achieving an improved sheet metal arrangement for a disc brake as well as an improved disc brake having a sheet metal arrangement.

SUMMARY OF THE INVENTION

In order for the object to be achieved, a disc brake of the aforementioned kind is characterized in accordance with the invention in that the sheet metal ring, for reducing the flexural stiffness thereof, has at least one cutout; a sheet metal arrangement is characterized in accordance with the invention in that the sheet metal ring, for reducing the flexural stiffness thereof, has at least one cutout. Further advantageous embodiments are to be derived from the dependent claims.

A disc brake according to the invention for a vehicle comprises a first brake pad and a second brake pad as well as a brake disc which is disposed therebetween and a brake caliper which engages over the brake disc and has a brake caliper housing in which a tensioning installation is disposed, wherein the tensioning installation comprises a compression piece which is able to be tensioned in relation to the first brake pad, wherein a bellows for protecting the interior of the brake caliper housing against contamination is provided, wherein the bellows by way of a first end region is fastened to the brake caliper housing and by way of a second end region is fastened to a sheet metal arrangement made from a sheet metal plate and a sheet metal ring which is disposed so as to be coaxial with and connected to the latter in a materially integral manner, wherein the sheet metal plate is disposed between an end side of the compression piece and the first brake pad, wherein the sheet metal ring is disposed between the bellows and the brake pad for protecting the bellows against thermal radiation that is generated on the brake pads and the brake disc by braking procedures, and wherein the sheet metal ring for reducing the flexural stiffness thereof has at least one cutout. The compression piece in the longitudinal direction thereof is preferably configured so as to be freely movable in relation to the sheet metal plate and the sheet metal ring.

A tensioning installation is understood to be those components of the disc brake by means of which the drive force generated by a force element, for example a compressed-air cylinder, is converted to a tensioning force which acts on the brake pads. In the case of disc brakes that are activated by compressed air, a pressure-boosting brake lever which is pivotably mounted in the brake caliper housing is a component part of this tensioning installation.

A sheet metal assembly according to the invention for a disc brake of a vehicle comprises a central sheet metal plate and a sheet metal ring which is disposed so as to be coaxial with and connected to the latter in a materially integral manner, wherein the sheet metal plate is provided for being disposed between an end side of a compression piece and a brake pad, wherein the sheet metal ring is provided for being disposed between a bellows and the brake pad and serves for protecting the bellows against thermal radiation, wherein the sheet metal ring for reducing the flexural stiffness thereof has at least one cutout.

In other words, the at least one cutout is provided for generating a structural weakness in the sheet metal ring, wherein the flexural stiffness of the sheet metal ring is reduced on account thereof, and the sheet metal ring thus can be more readily elastically deformed. On account of the reduction in terms of the flexural stiffness of the sheet metal ring, the materially integral connection, or the connection point, respectively, between the sheet metal plate and the sheet metal ring is protected against an increase in terms of a force acting thereon in that a force introduced into the sheet metal ring is converted to a deformation of the sheet metal ring. Furthermore, the flexural stiffness as well as the properties of thermal insulation or thermal reflection, respectively, can be set in a targeted manner by way of a targeted selection of the material of the sheet metal ring, so as to increase the protection of the bellows. The sheet metal ring is preferably configured from a spring steel. The sheet metal ring can preferably at least in part have a heat-resistant, in particular heat-reflecting, coating.

The sheet metal plate and the sheet metal ring are in particular connected to one another by welding or adhesive bonding, wherein the weld seam or the adhesive joint, respectively, is preferably configured in an encircling manner. Alternatively, a plurality of weld seam portions or adhesive joint portions, respectively, can be disposed so as to be uniformly distributed across the circumference between the sheet metal plate and the sheet metal ring, so as to configure the sheet metal arrangement.

The sheet metal ring in an integral manner preferably has a cylindrical portion as well as an annular disc-shaped portion. The cylindrical portion can be configured so as to be substantially perpendicular to the annular disc-shaped portion. The sheet metal ring is in particular produced by cold forming, wherein the cylindrical portion is preferably deep-drawn. The cylindrical portion, by virtue of the function thereof, in particular has a higher flexural stiffness than the annular disc-shaped portion, since the cylindrical portion is provided for receiving the sheet metal ring.

An encircling annular gap is preferably configured between the cylindrical portion and a longitudinal portion of the compression piece that is disposed in the cylindrical portion. Consequently, the cylindrical portion of the sheet metal ring is not supported on a circumferential face of the compression piece.

The bellows is preferably fastened to the cylindrical portion of the sheet metal ring by means of a tension ring. The bellows thus comes to bear in a radial manner on an external circumferential face of the cylindrical portion, wherein the tension ring secures the second end region of the bellows on the cylindrical portion of the sheet metal ring in a positionally fixed manner, consequently in relation to an axial displacement as well as in relation to rotation. In particular, a further tension ring which secures a first end region of the bellows on the brake caliper housing is provided. An annular sheet metal receptacle plate is preferably disposed between the brake caliper housing and the bellows so as to be in an opening of the brake caliper housing.

Furthermore preferably, a disc having a non-stick effect is disposed on the annular disc-shaped portion, between the bellows and the annular disc-shaped portion. Consequently, the disc at least in part has a non-stick configuration, or non-stick properties, respectively. For example, at least an end face of the disc that is oriented towards the bellows has a non-stick coating. At least an end face of the disc that is oriented toward the annular disc-shaped portion preferably has a heat-resistant, in particular heat-reflecting, coating. The disc is in particular configured from a plastics material. The disc, or the coating on the disc, is preferably at least partially or completely comprised of polytetrafluoroethylene (PTFE). The disc thus serves for preventing the bellows from adhering or sticking in the case of contact, on the one hand, and for further reducing the thermal radiation in the direction of the bellows, on the other hand.

The disc having the non-stick effect is in particular connected to the sheet metal ring in a materially integral and/or form-fitting manner. For example, at least the annular disc-shaped portion is coated, overmolded or overcast with a plastics material that configures the disc in such a manner that at least the end face that is oriented toward the bellows has non-stick properties.

According to one preferred embodiment, the annular disc-shaped portion in the direction toward the bellows is disposed so as to be axially recessed in relation to the sheet metal plate. In other words, the annular disc-shaped portion is disposed in a first plane, and the sheet metal plate is disposed in a second plane, wherein the two planes are configured so as to be substantially parallel and thus are not identical. Consequently, the two planes are mutually spaced apart by a gap, wherein the axial spacing between the two planes represents the gap, or the offset, respectively, between the annular disc-shaped portion and the sheet metal plate. Under normal conditions, this gap prevents any contact between the annular disc-shaped portion and the first brake pad.

A plurality of cutouts can be configured on the annular disc-shaped portion so as to be uniformly distributed in the circumferential direction. A plurality of cutouts are preferably disposed so as to be uniformly distributed in the circumferential direction and so as to be mutually adjacent on at least one circular path. The uniform distribution of the cutouts on the annular disc-shaped portion enables the flexural stiffness of the annular disc-shaped portion to be set in a homogeneous and thus uniform manner.

The cutouts are preferably configured in the shape of elongate slots or slits. For example, the cutouts can be configured so as to be of different sizes or lengths, respectively. All cutouts are preferably configured so as to be mutually identical.

Furthermore preferably, the cutouts extend predominantly in the circumferential direction or predominantly in the radial direction. For example, the cutouts are configured so as to be radially inward from an external circumference of the annular disc-shaped portion such that a trapezoidal segment is configured in the circumferential direction between two cutouts, the trapezoidal segment being particularly flexible in the axial direction, or along the longitudinal central axis of the tensioning installation, respectively.

The cutouts are in particular filled with the plastics material that forms the disc. In other words, at least the annular disc-shaped portion of the sheet metal ring is overmolded with plastics material in such a manner that the plastics material penetrates and closes the cutouts. The flexibility of the annular disc-shaped portion is preserved herein.

Further measures which improve the invention will be illustrated in more detail hereunder conjointly with the description of preferred exemplary embodiments of the invention by means of the figures, in which:

DESCRIPTION OF PREFERRED EMBODIMENTS

Figure 1:
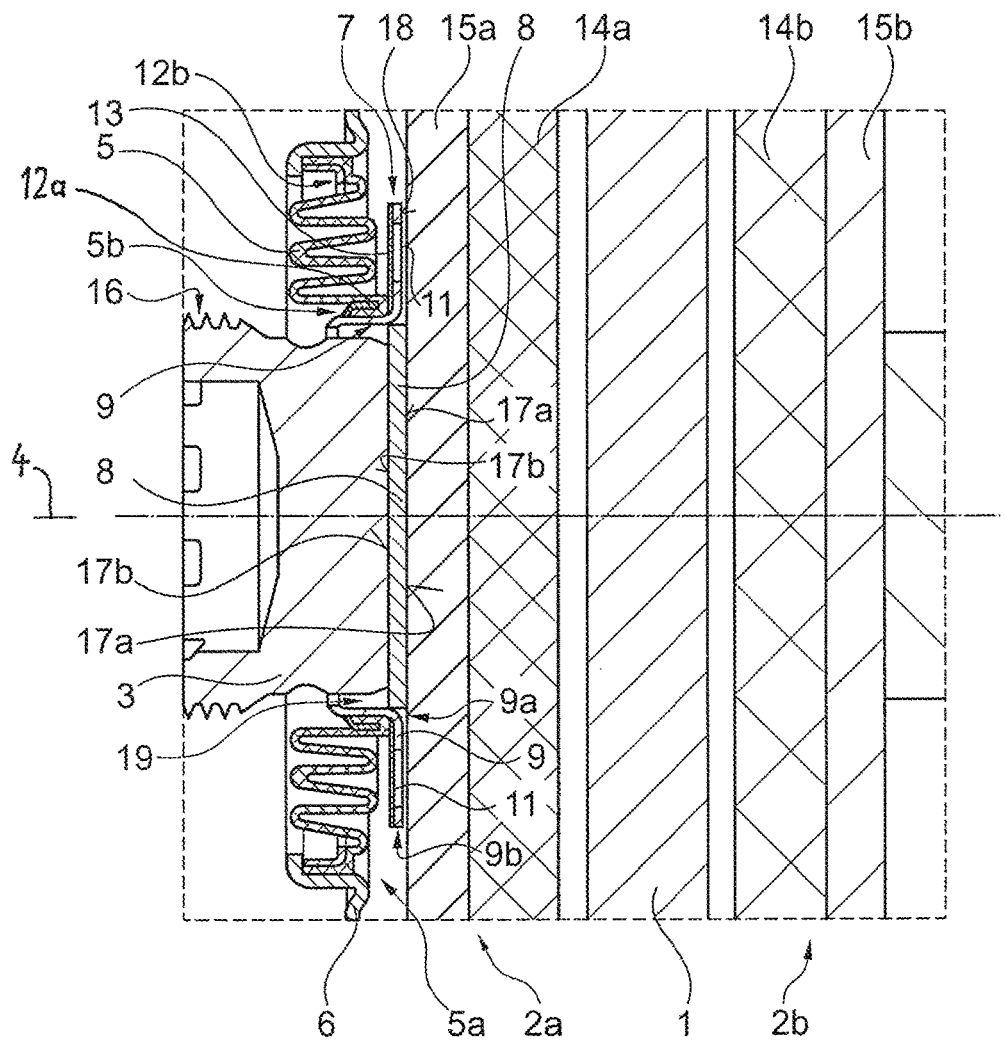
FIG. 1 shows a simplified schematic sectional illustration of a partially illustrated disc brake according to the invention having a sheet metal arrangement according to the invention, wherein a brake pad of the disc brake is not yet worn.

Illustrated according to FIG. 1 is a disc brake, in particular a pneumatic disc brake for a vehicle, in particular for a commercial vehicle. A brake caliper which is not illustrated and may be designed as a fixed caliper or a floating caliper, as well as a brake disc 1, wherein brake pads 2a, 2b are disposed on both sides of the brake disc 1 in the brake caliper, are component parts of the disc brake. The brake pads 2a, 2b are in each case comprised of a friction pad 14a, 14b as well as a pad support plate 15a, 15b on the rear side. When the disc brake is activated, the friction pads 14a, 14b come to bear on the brake disc 1 so as to generate a frictional torque for decelerating the vehicle. The brake caliper, not illustrated, in a common construction mode is comprised of a brake caliper bridge, which encompasses the brake disc 1 in a U-shaped manner, as well as a brake caliper housing 6, of which only a formed sheet metal part is reproduced in FIG. 1 and FIG. 2. A tensioning installation of the disc brake is situated in the brake caliper housing 6 of the brake caliper.

A readjustment installation is moreover a component part of the disc brake. The readjustment installation serves for compensating the play of the disc brake which increases as a result of the ongoing wear on the brake pads 2a, 2b and the brake disc 1. As the disc brake is being readjusted, a compression piece 3 which is a component part of the tensioning installation is repositioned along the longitudinal central axis 4 thereof toward the brake disc 1 over time. This becomes particularly evident when comparing FIG. 1 and FIG. 2.

According to FIG. 1, the brake pads 2a, 2b of the disc brake are not yet worn, wherein the compression piece 3 is completely retracted. As per FIG. 2, the brake pads 2a, 2b of the disc brake are heavily worn, wherein the compression piece 3 is completely deployed.

The compression piece 3 is configured so as to be substantially rotationally symmetrical. On the external side thereof, on part of the length thereof, it is provided with an external thread 16 and conjointly with a threaded nut, not illustrated here, forms a screw drive. A rotation of the compression piece 3, which is configured as a threaded spindle, takes place during the readjustment for example, wherein the compression piece 3 is furthermore imparted a translatory movement along the longitudinal central axis 4 toward the brake disc 1 so as to correct the play. The threaded nut is established in a stationary manner. Since the compression piece 3 moves out of the brake caliper housing 6 as the wear on the pad increases, a protection of the interior of the brake caliper housing 6 against external contamination is required to meet this potential for movement. This is because an atmosphere which is heavily charged with dust and humidity prevails specifically in the region of the brake pads 2a, 2b. For this reason, the brake caliper housing 6 is provided with a seal in relation to the first brake pad 2a, which is onboard the vehicle. This seal is assembled substantially from a deformable bellows 5 which is inserted in an opening of the brake caliper housing 6 and from a sheet metal arrangement 7 which closes the bellows 5 toward the brake disc 1. The bellows 5, which is comprised of rubber or an elastomer, by way of a first end region 5a is fastened to the brake caliper housing 6 so as to be secured against rotation. This fastening presently takes place by means of a tension ring 12b which tensions the first end region 5a in relation to the surrounding opening of the brake caliper housing 6. The bellows 5 by way of the second end region 5b thereof is fastened to the sheet metal arrangement 7 so as to be secured against rotation by way of a further tension ring 12a.

The sheet metal arrangement 7 is comprised of a sheet metal plate 8 and a sheet metal ring 9 which is disposed so as to be coaxial with the sheet metal plate 8 and connected to the sheet metal plate 8 in a materially integral manner. The sheet metal plate 8 is disposed between an end side of the compression piece 3 and the first brake pad 2a, and has a brake pad compression face 17a as well as a contact face 17b for the compression piece 3 that is configured opposite the brake pad compression face 17a. The brake pad compression face 17a comes to bear on the pad support plate 15a of the first brake pad 2a, and the contact face 17b for the compression piece 3 comes to bear on the compression piece 3. The compression piece 3 is disposed so as to be freely movable in the longitudinal direction in relation to the sheet metal plate 8.

The sheet metal ring 9 is disposed between the bellows 5 and the first brake pad 2a for protecting the bellows 5 against thermal radiation which is generated on the brake pads 2a, 2b and the brake disc 1 by braking procedures.

The sheet metal ring 9 has a substantially cylindrical portion 9a and a flat, annular disc-shaped portion 9b, wherein the cylindrical portion 9a is configured so as to be substantially perpendicular to the annular disc-shaped portion 9b and is integrally connected to the latter. Presently, the bellows 5 is fastened to the cylindrical portion 9a of the sheet metal ring 9 by means of the tension ring 12a. The disc-shaped portion 9b is disposed in the radial extension of the sheet metal plate 8. At the same time, the disc-shaped portion 9b in the direction toward the bellows 5 is disposed so as to be slightly axially recessed in relation to the sheet metal plate 8 so that a heat shield face 18 of the disc-shaped portion 9b that is oriented toward the first brake pad 2a typically does not come to bear on the first brake pad 2a.

Figure 2:
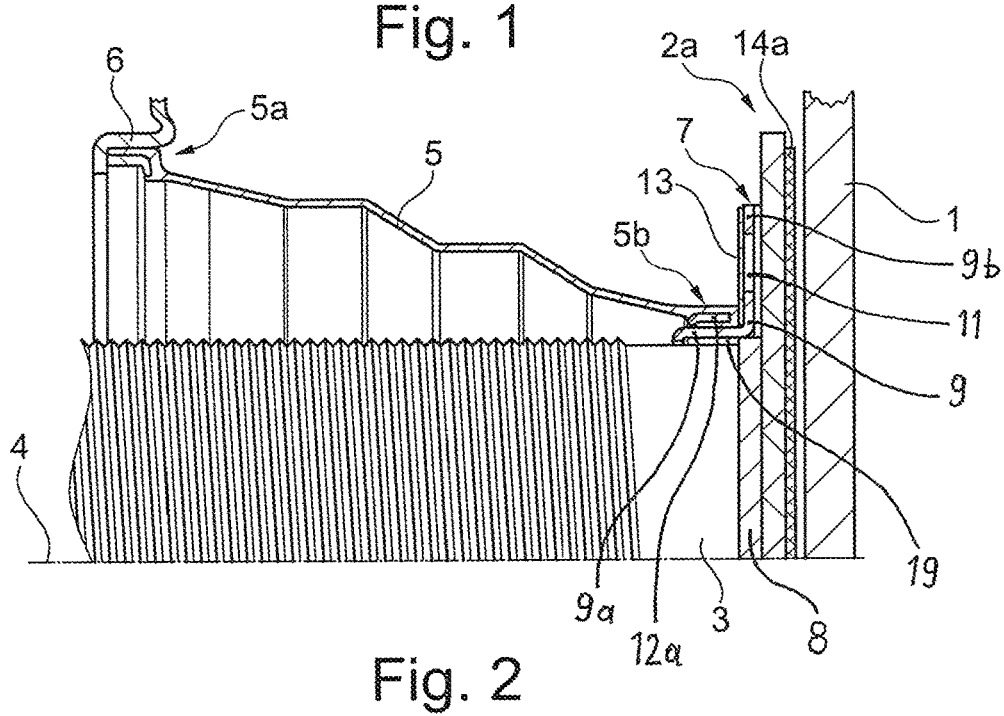
FIG. 2 shows a simplified schematic sectional illustration of the partially illustrated disc brake according to the invention and according to FIG. 1, wherein the brake pad of the disc brake is heavily worn.

An encircling annular gap 19 is configured between the cylindrical portion 9a and a longitudinal portion of the compression piece (FIG. 2). Consequently, the cylindrical portion 9a of the sheet metal ring 9 is not externally supported on the circumferential face of the compression piece 3. The compression piece 3 can thus freely rotate during readjustment, without the sheet metal ring 9 conjointly rotating.

Figure 4:
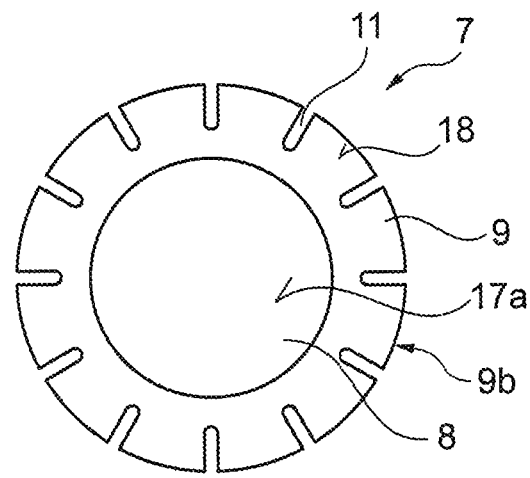
FIG. 4 shows a simplified schematic view of the end side of the sheet metal arrangement according to the invention and according to a second exemplary embodiment.
Figure 5:
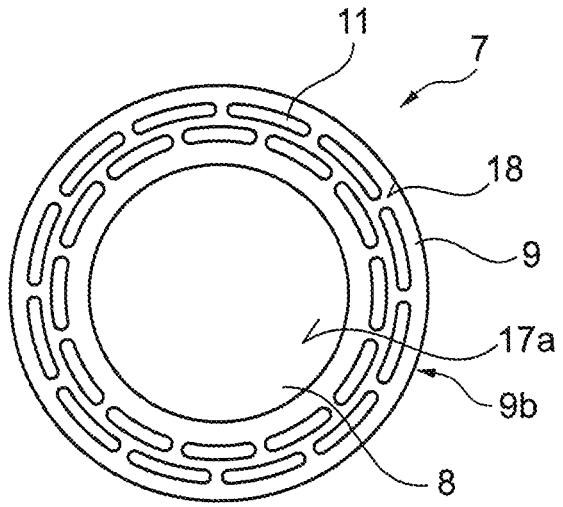
FIG. 5 shows a simplified schematic view of the end side of the sheet metal arrangement according to the invention and according to a third embodiment.

Under certain circumstances, contact between the first brake pad 2a and the sheet metal ring 9 can arise on account of contamination, for example. In the case of such contact, the connection point between the sheet metal plate 8 and the sheet metal ring 9 must be protected against stress by deformation, so as to prevent any damage to the materially integral connection. To this end, the sheet metal ring 9 has a plurality of cutouts 11 which are provided for reducing the flexural stiffness of the sheet metal ring 9. These cutouts 11 are more clearly illustrated in FIG. 3. Furthermore, further exemplary embodiments for the cutouts 11 are illustrated in FIG. 4 and FIG. 5. Under certain circumstances, it may also arise that the annular disc-shaped portion 9b of the sheet metal ring 9, by virtue of the reduced flexural stiffness thereof, is elastically deformed under the influence of force, for example by contamination, in such a manner that the annular disc-shaped portion 9b comes to bear on the bellows 5. In order for the bellows 5 to be even better protected against the thermal radiation during braking procedures, or to further reduce the thermal radiation acting on the bellows 5, respectively, a disc 13 is disposed on the end side on the annular disc-shaped portion 9b, so as to be between the bellows 5 and the disc-shaped portion 9b. This disc 13 in the present case is configured from a plastics material having a non-stick effect so as to additionally prevent the bellows 5 from sticking during contact with the disc 13. In other words, the disc 13 reduces the thermal radiation from the first brake pad 2a toward the bellows 5, on the one hand, and enables the bellows 5 to be released without any residue upon contact with the disc 13, on the other hand.

According to FIG. 2, the brake pad 2a of the disc brake is heavily worn. In particular, the friction pads 14a, 14b as well as the brake disc 1 have been worn through use, wherein only the first friction pad 14a is presently illustrated. The compression piece 3 is therefore fully deployed. The bellows 5 is likewise completely deployed. The first end region 5a of the bellows 5 herein has remained on the brake caliper housing 6, and the second end region 5b of the bellows 5, conjointly with the sheet metal arrangement 7 and the disc 13, has been axially displaced along the longitudinal central axis 4 by the compression piece 3.

Figure 3:
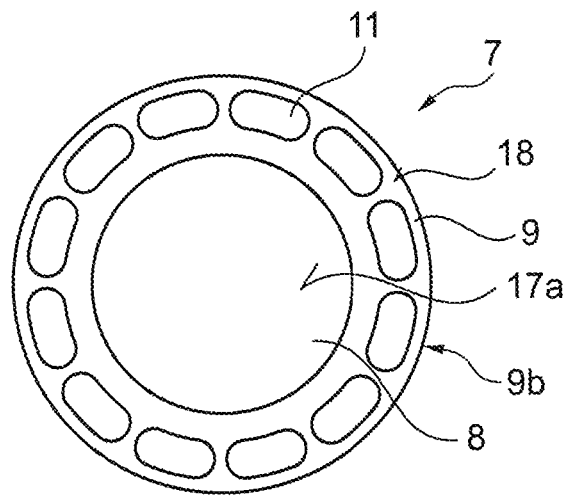
FIG. 3 shows a simplified schematic view of the end side of the sheet metal arrangement according to the invention and according to FIG. 1 and FIG. 2.

FIG. 3 shows the sheet metal arrangement 7 according to FIG. 1 and FIG. 2 in isolation, wherein the view takes place at the end side onto the brake pad compression face 17a of the sheet metal plate 8 and the heat shield face 18 of the sheet metal ring 9. By virtue of the illustration of the end side, only the annular disc-shaped portion 9b of the sheet metal ring 9 can be seen. A plurality of cutouts 11 are configured so as to be uniformly distributed in the circumferential direction in the annular disc-shaped portion 9b. The cutouts 11 are configured in the shape of elongate slots and extend in a bent or curved manner, respectively, in the circumferential direction. In other words, the cutouts 11 are disposed so as to be uniformly distributed in the circumferential direction and so as to be mutually adjacent on a shared circular path.

FIG. 4 shows a second embodiment of the sheet metal arrangement 7 in isolation. The view takes place at the end side onto the brake pad compression face 17a of the sheet metal plate 8 and the heat shield face 18 of the sheet metal ring 9. By virtue of the illustration of the end side, only the annular disc-shaped portion 9b of the sheet metal ring 9 can be seen. A plurality of cutouts 11 are configured so as to be uniformly distributed in the circumferential direction in the annular disc-shaped portion 9b. The cutouts 11 are radial slots. In the radial direction, they extend inward from the external circumference of the annular disc-shaped portion 9b. With a view to a positive elasticity and flexural capability, the length of the outwardly open slots 11 is more than half the radial extent of the annular disc-shaped portion 9b.

FIG. 5 shows a third embodiment of the sheet metal arrangement 7 in isolation, wherein the view takes place at the end side onto the brake pad compression face 17a of the sheet metal plate 8 and the heat shield face 18 of the sheet metal ring 9. By virtue of the illustration of the end side, only the annular disc-shaped portion 9b of the sheet metal ring 9 can be seen. A plurality of cutouts 11 are configured so as to be uniformly distributed in the circumferential direction in the annular disc-shaped portion 9b. The cutouts 11 are configured in the shape of elongate slots and extend in a bent or curved manner, respectively, in the circumferential direction. The cutouts 11 according to FIG. 5 are configured so as to be narrower than the cutouts 11 according to FIG. 3, wherein the cutouts 11 according to FIG. 5 are disposed so as to be distributed on two circular paths. The cutouts 11 on the outer circular path in the circumferential direction are configured so as to be slightly longer than the cutouts 11 on the inner circular path. Furthermore, the cutouts 11 on the outer circular path are configured so as to be out-of-phase, or so as to be offset in the circumferential direction, respectively, in relation to the cutouts 11 on the inner circular path.

LIST OF REFERENCE CHARACTERS

1 Brake disc
2a, 2b Brake pad
3 Compression piece
4 Longitudinal central axis
5 Bellows
5a, 5b End region
6 Brake caliper housing
7 Sheet metal arrangement
8 Sheet metal plate
9 Sheet metal ring
9a Cylindrical portion
9b Annular disc-shaped portion
10 Compression piece
11 Cutout
12a, 12b Tension ring
13 Disc
14a, 14b Friction pad
15a, 15b Pad support plate
16 External thread
17a Brake pad compression face
17b Contact face for the compression piece
18 Heat shield face
19 Annular gap

What is claimed is:
1. A disc brake for a vehicle, the disc brake comprising:
a first brake pad (2a) and a second brake pad (2b);
a brake disc (1) disposed between the first brake pad (2a) and the second brake pad (2b);
a brake caliper engaging over the brake disc (1) and comprising a brake caliper housing (6);
a tensioning installation disposed in the brake caliper housing (6) and comprising a compression piece (3) configured to be tensioned in relation to the first brake pad (2a);
a sheet metal arrangement (7) comprised of a sheet metal plate (8) and a sheet metal ring (9) disposed coaxially to the sheet metal plate (8) and connected to the sheet metal plate (8) in a materially integral manner;
a bellows (5) configured to protect an interior of the brake caliper housing (6) against contamination, wherein the bellows (5) comprises a first end region (5a) fastened to the brake caliper housing (6) and further comprises a second end region (5b) fastened to the sheet metal arrangement (7);
wherein the sheet metal plate (8) is disposed between an end side of the compression piece (3) and the first brake pad (2a);
wherein the sheet metal ring (9) is disposed between the bellows (5) and the brake pad (2a) so as to protect the bellows (5) against thermal radiation generated at the first and second brake pads (2a, 2b) and the brake disc (1) by a braking action;
wherein the sheet metal ring (9) comprises an annular disc-shaped portion (9b) disposed in a radial extension of the sheet metal plate (8), wherein the annular disc-shaped portion (9b) comprises cutouts (11) in the shape of elongate slots to reduce a flexural stiffness of the sheet metal ring (9);
wherein the cutouts (11) are uniformly distributed on the annular disc-shaped portion (9b) in a circumferential direction of the annular disc-shaped portion (9b) and are arranged adjacent to each other on at least one circular path; and a disc (13) disposed on the annular disc-shaped portion (9b) and arranged between the second end region (5b) of the bellows (5) and the annular disc-shaped portion (9b), wherein the disc (13) has a non-stick effect.

2. The disc brake as claimed in claim 1, wherein the sheet metal ring (9) comprises a cylindrical portion (9a) integral with the annular disc-shaped portion (9b) and arranged substantially perpendicular to the annular disc-shaped portion (9b).

3. The disc brake as claimed in claim 2, wherein the cylindrical portion (9a) of the sheet metal ring (9) surrounds a longitudinal portion of the compression piece (3).

4. The disc brake as claimed in claim 3, further comprising a tension ring (12a), wherein the second end region (5b) of the bellows (5) is fastened to the cylindrical portion (9a) of the sheet metal ring (9) by the tension ring (12a).

5. The disc brake as claimed in claim 1, wherein the annular disc-shaped portion (9b) is axially recessed in relation to the sheet metal plate (8) in a direction toward the bellows (5).

6. A sheet metal arrangement (7) for a disc brake of a vehicle, the sheet metal arrangement (7) comprising:
a sheet metal plate (8);
a sheet metal ring (9) disposed coaxially to the sheet metal plate (8) and connected to the sheet metal plate (8) in a materially integral manner;

wherein the sheet metal plate (8) is configured to be disposed between an end side of a compression piece of the disc brake and a brake pad of the disc brake;

wherein the sheet metal ring (9) is configured to be disposed between a bellows of the disc brake and a brake pad of the disc brake and is configured to protect the bellows against thermal radiation;

wherein the sheet metal ring (9) comprises an annular disc-shaped portion (9b) disposed in a radial extension of the sheet metal plate (8), wherein the annular disc-shaped portion (9b) comprises cutouts (11) in the shape of elongate slots to reduce a flexural stiffness of the sheet metal ring (9);

wherein the cutouts (11) are uniformly distributed on the annular disc-shaped portion (9b) in a circumferential direction of the annular disc-shaped portion (9b) and are arranged adjacent to each other on at least one circular path; and wherein a disc (13) having a non-stick effect is disposed on the annular disc-shaped portion (9b).

7. The sheet metal arrangement (7) as claimed in claim 6, wherein the sheet metal ring (9) comprises a cylindrical portion (9a) integral with the annular disc-shaped portion (9b) and arranged substantially perpendicular to the annular disc-shaped portion (9b).

8. The sheet metal arrangement (7) as claimed in claim 6, wherein the annular disc-shaped portion (9b) is axially recessed in relation to the sheet metal plate (8) in a direction toward the bellows of the disc brake.

\* \* \* \* \*